US 6,671,878 B1

(12) United States Patent
Bliss

(10) Patent No.: US 6,671,878 B1
(45) Date of Patent: Dec. 30, 2003

(54) MODULO SCHEDULING VIA BINARY SEARCH FOR MINIMUM ACCEPTABLE INITIATION INTERVAL METHOD AND APPARATUS

(76) Inventor: Brian E. Bliss, 42638 Isle Royal, Fremont, CA (US) 94538

(*) Notice: Subject to any disclaimer, the term of this patent is extended or adjusted under 35 U.S.C. 154(b) by 0 days.

(21) Appl. No.: 09/535,930

(22) Filed: Mar. 24, 2000

(51) Int. Cl.⁷ .................................................. G06F 9/45
(52) U.S. Cl. .................. 717/161; 717/150; 717/141; 717/151; 717/160; 712/215; 712/241; 712/244
(58) Field of Search ................... 717/161, 150, 717/146, 156, 154, 158, 153, 141, 151, 159, 160; 712/215, 241, 233, 234, 244

(56) References Cited

U.S. PATENT DOCUMENTS

| | | | |
|---|---|---|---|
| 5,361,357 A | | 11/1994 | Kionka .......................... 395/700 |
| 5,491,823 A | * | 2/1996 | Ruttenberg ................... 717/161 |
| 5,664,193 A | * | 9/1997 | Tirumalai ..................... 717/153 |
| 5,805,895 A | | 9/1998 | Breternitz, Jr. et al. ...... 395/709 |
| 5,809,308 A | * | 9/1998 | Tirumalai ..................... 717/161 |
| 5,835,745 A | * | 11/1998 | Sager et al. .................. 717/161 |
| 5,835,776 A | * | 11/1998 | Tirumalai et al. ............ 717/161 |
| 5,862,384 A | * | 1/1999 | Hirai ............................ 717/160 |
| 5,867,711 A | * | 2/1999 | Subramanian et al. ....... 717/161 |
| 5,930,510 A | * | 7/1999 | Beylin et al. ................ 717/161 |
| 6,341,370 B1 | * | 1/2002 | Tirumalai et al. ............ 717/141 |
| 6,438,682 B1 | * | 8/2002 | Morris et al. ................ 712/241 |
| 6,438,747 B1 | * | 8/2002 | Schreiber et al. ............ 717/160 |
| 6,460,173 B1 | * | 10/2002 | Schreiber ..................... 716/18 |

OTHER PUBLICATIONS

Microsoft Press, Microsoft Press Computer Dictionary, 1994, Microsoft Press, p.43.*
Title: Unrolling–Based Optimizations for Modulo Scheduling, author: Lavery et al, IEEE, 1995.*
Title: Optimum Modulo Schedules for Minimum Register Requirements, author: Eichenberger et al, ACM, 1995.*
Title: Lifetime–Sensitive Modulo Scheduling, author: Huff, ACM, 1993.*
Title: Parallelization of Loops with Exits on Pipelined Architectures, author: Tirumalai et al, IEEE, Nov., 1990.*
Title: Software Pipelining Showdown: Optimal vs. Heuristic Methods in Production Compiler, author: Ruttenberg et al, ACM, 1996.*
Title: Code Generation Schema for Modulo Scheduled Loops, author: Rau et al, IEEE, 1992.*

* cited by examiner

Primary Examiner—Chameli C. Das
(74) Attorney, Agent, or Firm—Martine & Penilla, LLP

(57) ABSTRACT

Disclosed herein is an instruction set scheduling system for scheduling instruction sets in a pipelined processing system. In particular, the scheduling system includes a binary search technique for ascertaining the minimum acceptable iteration interval amongst a range of possible iteration intervals for use by the modulo scheduler.

12 Claims, 3 Drawing Sheets

MODULO SCHEDULING VIA BINARY SEARCH FOR MINIMUM ACCEPTABLE INITIATION INTERVAL METHOD AND APPARATUS

BACKGROUND OF THE INVENTION

1. Field of the Invention

The present invention relates generally to compiler software pipelining. More particularly, the present invention relates to enhanced modulo scheduling techniques for software pipelining.

2. The Prior Art

A recent trend in processor design is to build processors with increasing instruction issue capability and many functional units. At the same time the push toward higher clock frequencies has resulted in deeper pipelines and longer instruction latencies. To utilize the resources available in such processors it is important to employ scheduling techniques that can extract sufficient instruction level parallelism (ILP) from programs. Modulo scheduling is a known technique for extracting ILP from inner loops by overlapping the execution of successive iterations.

Modulo scheduling is a well known compiler optimization technique that calculates a theoretical minimum initiation interval (minimum II), which is a measure of the execution time, and then producing an instruction schedule using a modulo reservation table which is II cycles in length. If such a schedule can be determined, it is known to be optimal.

In standard modulo scheduling, if an acceptable schedule cannot be found for a minimum II, the value of II is incremented until a schedule can be found. As chips become faster, with more pipeline stages and higher latencies in terms of cycles, the lack of available registers in the instruction set becomes problematic. Fewer loops can be is scheduled with the minimum II, and the minimum acceptable II increase for those loops that cannot be scheduled with a minimum II. Therefore, it becomes harder and more time consuming for the compiler to find the minimum acceptable II or best practical II, resulting in an increase in compilation time.

BRIEF DESCRIPTION OF THE INVENTION

To overcome these and other shortcomings of the prior art, disclosed herein is an enhanced modulo scheduling technique. Register pressure, or the number of registers required for a given loop schedule, tends to decrease monotonically with increasing II. Hence, it is possible to apply a binary search method to locate the minimal acceptable II in an amount of time which is proportional to the logarithm of the size of the range of attempted IIs, rather than directly proportional to the size of the range itself.

Although the aforementioned monotonically decreasing condition does not necessarily hold for all loops, it nearly always does in practice. When this condition does not hold true, this method will still produce an acceptable schedule, although it may be for an II which is larger than the minimum acceptable II. Usually the same results will be achieved as with the conventional iterative method, i.e. same II provided. However, during compile time, this new method will provide the result in less time.

BRIEF DESCRIPTION OF THE DRAWING FIGURES

DETAILED DESCRIPTION OF THE INVENTION

Persons of ordinary skill in the art will realize, that the following description of the present invention is illustrative only and not in any way limiting. Other embodiments of the invention will readily suggest themselves to such skilled persons having the benefit of this disclosure.

Figure 1:
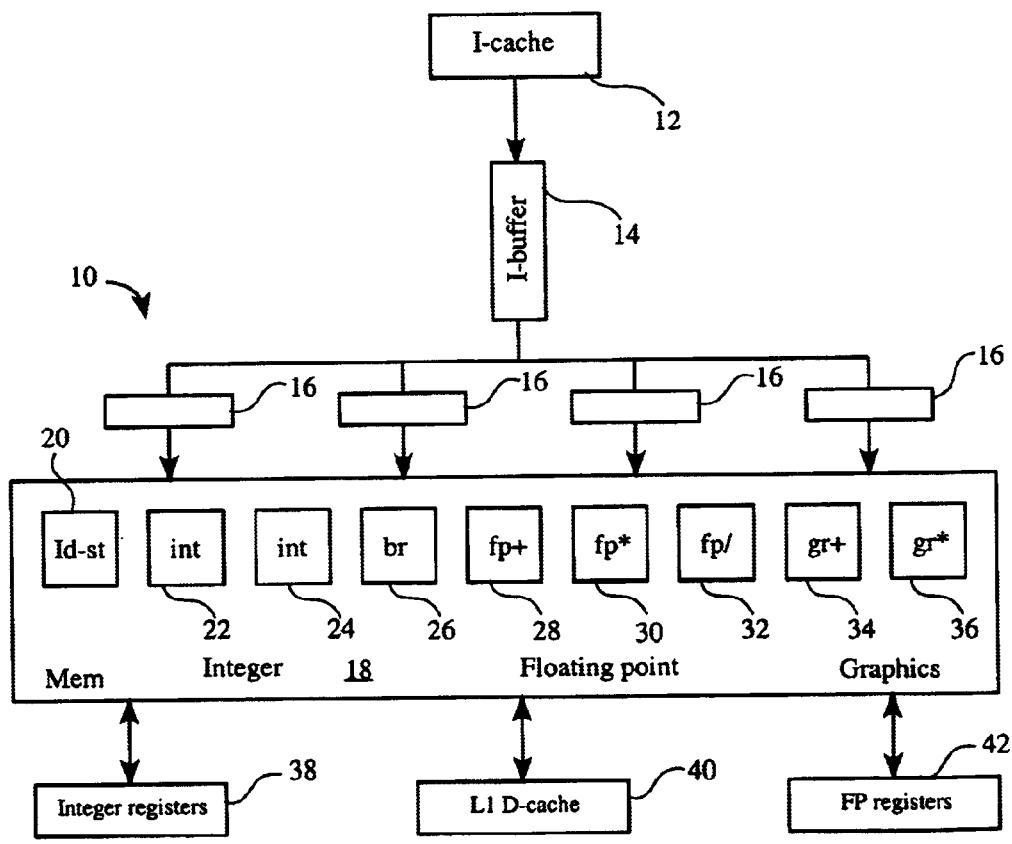
FIG. 1 is a block diagram of a target processor.

Referring now to FIG. 1, a simple model of a processor is depicted. It has nine functional units 18 and is capable of issuing up to four instructions 16 per clock. The nine functional units consist of a load/store unit (LSU) 20, integer execution units (ISUs) 22 and 24, branch unit 26, floating point add 28, floating point multiply 30, floating point divide 32, graphics add 34, and graphics divide 36.

Instructions are fetched from the instruction cache or I-cache 12 into the instruction buffer or I-buffer 14. Up to four instructions are dispatched per clock to the nine functional units 18 which read from and write to the register files 38 and 42 and the data cache 40. A "next field" associated with every four instructions in the instruction cache (I-Cache) points to the next I-Cache line to be fetched. The use of the next field makes it possible to follow taken branches and to provide nearly the same instruction bandwidth achieved while running sequential code. Prefetched instructions are stored in the Instruction Buffer until they are sent to the rest of the pipeline; up to 12 instructions can be buffered. Thirty-one instructions have to be scheduled between load and use to operate at peak rate out of the L2 cache. The load latencies, for example, are 2 and 8 clocks for hits in the L1 and L2 caches, respectively, 1 clock for hits to the integer units, 3 clocks for hits to the floating point add or multiply units, 12 clocks for single floating point divide, and 22 clocks for double floating point divide. The processor depicted is exemplary only and not intended in any way to be limiting.

The strategy used by the modulo scheduler is to schedule loads to the L2 cache for all floating point codes and to the L1 cache for integer codes. This default policy can be overwritten, of course, with command line options. Integer loops are scheduled to the L1 cache for three reasons. First, integer programs tend to have good hit rates in L1. Second, scheduling them to L2 would create high register pressure as both data and addresses vie for the limited integer registers. Note that with floating point loops, data resides in the floating point registers whereas addresses reside in the integer registers. And third, integer loops tend to have low trip counts. Long load latencies are less effective on such low trip counts because of the higher startup cost.

Figure 2:
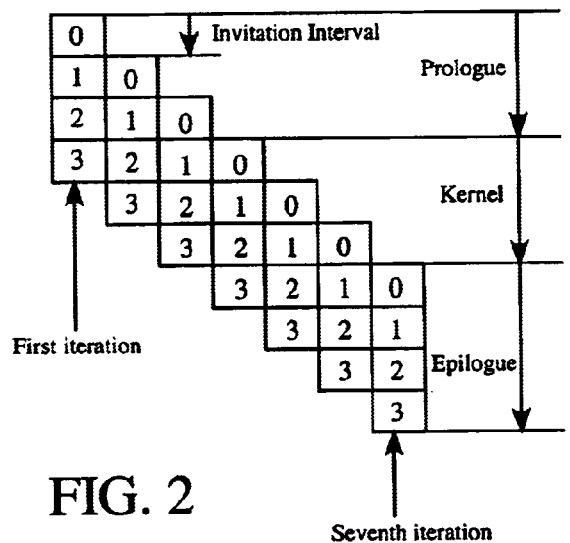
FIG. 2 is a block diagram of an iteration pipeline.

In modulo scheduling, parallelism is extracted by starting an iteration before the previous iteration has completed. The basic idea is to initiate new, iterations after fixed time intervals. This time interval is called the initiation interval or the iteration interval (II). Referring now to FIG. 2, the execution of seven iterations of a pipelined loop are shown. The stage count, SC, is defined as $$SC = \left\lceil \frac{TL}{II} \right\rceil,$$

where TL is the scheduled length of a single iteration and TL is divided into stages each of length II. Loop execution begins with stage 0 of the first iteration. During the first II cycles, no other iteration executes concurrently. After the first II cycles, the first iteration enters stage 1 and the second iteration enters stage 0. New iterations join every II cycles until a state is reached when all stages of different iterations are executing. Toward the end of loop execution no new iterations are initiated and those that are in various stages of progress gradually complete.

These three phases of loop execution are called the prologue, the kernel, and the epilogue. During the prologue and the epilogue, not all stages of successive iterations execute. On the other hand, during the kernel phase, all stages of successive iterations do execute. The prologue and the epilogue last for (SC−1)×II cycles. If the trip count is large, the kernel phase will last much longer than the prologue or epilogue. The primary performance metric for a modulo scheduled loop is the initiation interval, II. It is a measure of the steady state throughput for loop iterations. Smaller II values imply higher throughput. Therefore, the scheduler attempts to derive a schedule that minimizes the II.

Figure 3:
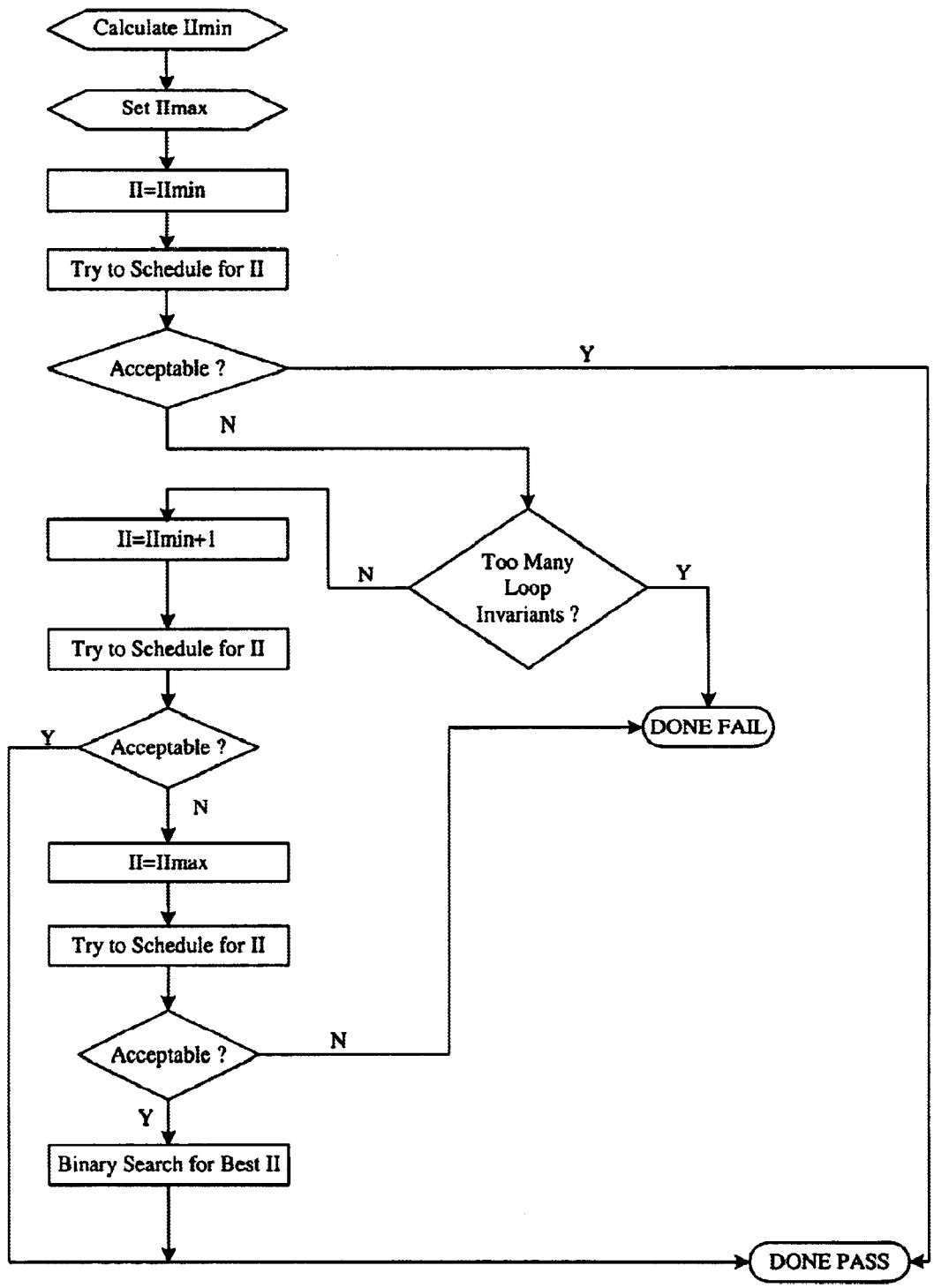
FIG. 3 is a flowchart of an overview of the inventive process of the present invention.

Referring now to FIG. 3, scheduling proceeds as follows. A minimum II, IImin, is calculated. IImin is a bound on the minimum number of cycles needed to complete one iteration and is based on processor resources and dependencies between instructions. For example, if a loop has 10 add operations and the processor can execute at most two adds per clock, then the add unit resource would limit the iteration throughput to at most one every five clocks. IImin is calculated by taking each resource in turn and then taking the maximum of the bounds imposed by each. This calculated IImin is thus the minimum II achievable, but may not be an acceptable II in reality depending on such other variables as register pressure. That is, once the minimum II is determined, it may not in some instances be utilized due to high register pressure. In which case, a minimum acceptable II (as opposed to minimum II) must be found, given the practical reality of the situation.

The maximum II, IImax, is set and is a bound based on a function of IImin or the results of an alternate scheduling method. Therefore, the range in consideration for the minimum acceptable II is from IImin to IImax. The object then is to locate the minimum acceptable II as quickly as possible.

Practice has shown that on many instances, either the calculated IImin may be utilized, which is optimal, or the next increment, IImin+1, may be utilized. As either of these II's would be preferred to, any other value of II, then, each is first checked in order, to see if an acceptable schedule may be produced. If either can be scheduled, they would be scheduled.

Therefore, first IImin is checked for scheduling in a prebinary search engine such as shown in FIG. 3. If an acceptable schedule cannot be found for IImin, then also as part of the initial checking, a check of the register pressure is made to determine if too many loop invariants exist. If so, the process will terminate in a fail. It should be noted however, that this fail has no detrimental effect on this method as opposed to conventional methods. That is, conventional scheduling methods must accommodate this fail as well. If, however, the instruction set is not of such complexity, then IImin+1 will be checked as noted above. As indicated above, in many instances IImin or IImin+1 will be schedulable, in which case, the minimum acceptable II will be found quite rapidly. Hence, if either may be scheduled, the process will terminate in a pass and the instruction set will be scheduled with the passing, or minimum acceptable, II.

On the other hand, in those instances when neither IImin or IImin+1 can be scheduled, for instance due to high register pressure, then the next logical step is to check to see if IImax may be scheduled. That is, if the register pressure is so high that even IImax cannot be scheduled, there is no point searching the range between IImin and IImax for an II because none will work (assuming that register pressure is monotonically non-increasing with II).

Figure 4:
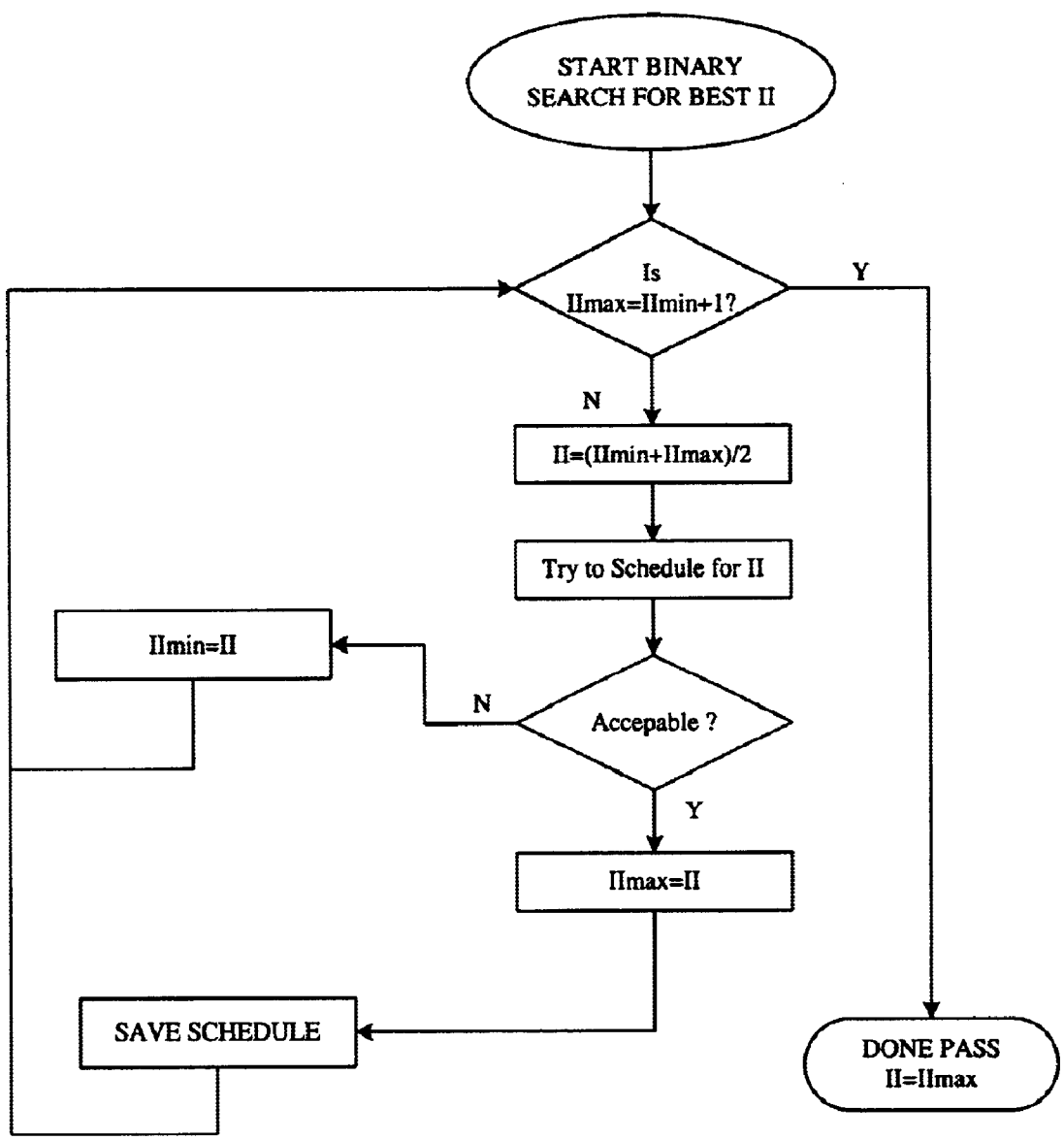
FIG. 4 is a flowchart of the search technique of the inventive process of the present invention.

If IImax does work however, then a search will be made for the minimum acceptable II between IImin+1 and IImax. To expedite the search for the minimum acceptable II in this range, and referring now to FIG. 4, a binary search technique will be utilized. Such a technique allows a far more rapid search for the minimum acceptable II as compared to the old incremental search method. That is, for example, for a list containing 2 billion values to be searched, an incremental or linear search could involve up to 2 billion checks. On the other hand, employing a binary search would require a maximum of 32 checks. This is due to the fact that the amount of time to search via this binary search method is proportional to the logarithm of the size of the range of potential IIs, rather than directly proportional to the size of the range itself.

By continually dividing the range in half (II=(IImin+IImax)/2) and checking to see if the II in question will work given the register pressure, a minimum acceptable II will be found far more rapidly. That is, instead of the range remaining static and the search for minimum acceptable II continuing one step at a time, the range is continually and dynamically reduced by half until the minimum acceptable II is located.

For example, at the start of the, binary search, if IImax is not equal to IImin+1, then the midpoint of the range will be checked (II=(IImin+IImax)/2). This II will be checked for available scheduling. If it can be scheduled, this II becomes the new upper bound on the range, or IImax, and this II schedule is saved as a possible minimum acceptable II.

Then a check is made with this new IImax value to see if it is equal to IImin+1, which would indicate that this new IImax is but one greater than the range minimum and logically the minimum acceptable II, the goal sought by this method. If this is the case, this minimum acceptable II will be scheduled, thus, terminating the process in a pass. If this new IImax is not equal to IImin+1, then the range is cut in half again and the midpoint again checked for scheduling as above.

If the II (midpoint value) cannot be scheduled, then this II becomes the new lower bound on the range, or IImin. Then, if IImax is equal to this new IImin+1, then IImax (which has already been verified as schedulable) is the minimum acceptable II since it is but one increment higher than IImin (which did not work). The process is thus terminated in a pass with IImax becoming the minimum acceptable II to utilize. Else, the process is repeated until the minimum acceptable II is located.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An instruction set scheduling system, comprising in combination:

an instruction cache;

an instruction buffer in operative communication with said instruction cache;

a plurality of functional units in operative communication with said instruction buffer;

a plurality of registers in operative communication with said functional units;

an L1 and an L2 cache in operative communication with said registers;

a modulo scheduler in operative communication with said instruction cache;

a binary search module within said modulo scheduler configured to locate a minimum acceptable iteration interval for said modulo scheduler by employing a binary search techniques; and a pre binary search engine within said modulo scheduler configured to ascertain the acceptability of preset condition.

2. The instruction set scheduling system of claim 1 wherein said binary search module includes means for recursively checking a midpoint iteration interval value of a dynamically changing range of iteration intervals for scheduling the instruction set.

3. The instruction set scheduling system of claim 2 wherein said prebinary search engine includes means for ascertaining, testing, and scheduling a minimum iteration interval value as a preset condition.

4. The instruction set scheduling system of claim 2 wherein said prebinary search engine includes means for ascertaining and testing for excessive loop invariants in the instruction set as a preset condition.

5. The instruction set scheduling system of claim 2 wherein said prebinary search engine includes means for ascertaining and testing a maximum iteration interval value as a preset condition.

6. A method for determining a modulo schedule, comprising in combination:

calculating a minimum iteration interval for an instruction set;

setting a maximum iteration interval for the instruction set;

determining whether said minimum iteration interval is acceptable for scheduling the instruction set;

scheduling the instruction set upon successful determination of said minimum iteration interval scheduling;

checking loop invariants upon unsuccessful determination of minimum iteration interval scheduling;

terminating the process in a failure upon determination of excessive loop invariants;

determining whether said minimum iteration interval incremented by one is acceptable for scheduling the instruction set;

scheduling the instruction set upon successful determination of said incremented minimum iteration interval scheduling;

determining whether said maximum iteration interval is acceptable for scheduling the instruction set;

restarting the process with new minimum and maximum iteration interval values upon unsuccessful maximum iteration interval scheduling;

searching for the minimum acceptable iteration interval between said minimum iteration interval and said maximum iteration interval by employing a binary search technique;

scheduling the instruction set with the minimum acceptable iteration interval; and a pre binary search engine within said modulo scheduler configured to ascertain the acceptability of preset condition.

7. The method for determining a modulo schedule of claim 6 further comprising recursively checking a midpoint iteration interval value of a dynamically changing range of iteration intervals for scheduling the instruction set as part of said binary search technique.

8. In a memory space, an instruction set scheduling system, comprising in combination:

a modulo scheduler;

a binary search module within said modulo scheduler for aiding said modulo scheduler in determining the minimum acceptable iteration interval for an instruction set; and a pre binary search engine within said modulo scheduler configured to ascertain the acceptability of preset condition.

9. The instruction set scheduling system of claim 8 wherein said binary search module includes means for recursively checking a midpoint iteration interval value of a dynamically changing range of iteration intervals for scheduling the instruction set.

10. The instruction set scheduling system of claim 9 wherein said prebinary search engine includes means for ascertaining, testing, and scheduling a minimum iteration interval value as a preset condition.

11. The instruction set scheduling system of claim 9 wherein said prebinary search engine includes means for ascertaining and testing for excessive loop invariants in the instruction set as a preset condition.

12. The instruction set scheduling system of claim 9 wherein said prebinary search engine includes means for ascertaining and testing a maximum iteration interval value as a preset condition.

* * * * *